United States Patent [19]
Higley

[11] Patent Number: 5,492,782
[45] Date of Patent: Feb. 20, 1996

[54] BATTERY HAVING FIBER ELECTRODES

[75] Inventor: Lin R. Higley, Troy, Mich.

[73] Assignee: Hughes Aircraft Company, Los Angeles, Calif.

[21] Appl. No.: 350,348

[22] Filed: Dec. 6, 1994

[51] Int. Cl.$^6$ .............................. H01M 2/02; H01M 4/88; H01M 10/04
[52] U.S. Cl. .................... 429/164; 429/127; 429/140; 429/176; 429/238
[58] Field of Search .................................... 429/238, 140, 429/127, 128, 164, 176

[56] References Cited

U.S. PATENT DOCUMENTS

| | | | |
|---|---|---|---|
| 3,661,644 | 5/1972 | Arrance | 429/140 |
| 4,160,068 | 7/1979 | Kummer . | |
| 4,522,897 | 6/1985 | Walsh | 429/119 |
| 4,788,114 | 11/1988 | Rothman . | |
| 5,330,856 | 7/1994 | Gonzalez | 429/212 |

OTHER PUBLICATIONS

Tim Stevens, "Electrically Conductive Polymers", Mechanical Engineering, pp. 21–24 (1991). Month Unknown.
Anon., "Lightweight, High–Energy Lead/Acid Battery," NASA Tech Briefs pp. 21–22 (Apr. 1991).
Anon., "Dr. Gereth... Varta's 'no miracles' man," Batteries International pp. 21, 20 and 24 (Jan. 1993).

*Primary Examiner*—Prince Willis, Jr.
*Assistant Examiner*—Richard H. Lilley, Jr.
*Attorney, Agent, or Firm*—Terje Gudmestad; Wanda K. Denson-Low

[57] ABSTRACT

A high-storage-capacity electrical storage battery (20) includes a plurality of fiber anodes (22), a plurality of fiber cathodes (28) bundled together and interspersed with the fiber anodes (22), and an electrolyte in the interstices (40) between the fiber anodes (22) and the fiber cathodes (28). The fiber anodes (22) and the fiber cathodes (28) include anode fibers (24) and cathode fibers (30) that are each preferably of a diameter of 0.010–0.050 inches. A tubular compliant lateral casing (44) laterally surrounds the fiber anodes (22), the fiber cathodes (28), and the electrolyte. A compliant end plate (46) is sealed to the lateral casing (44) at each end thereof with an end of each fiber anode (22) extending out of a first end plate at a first end of the battery (20), and an end of each fiber cathode extending out of a second end plate at a second end of the battery (20). A protective metallic housing (45) overlies the compliant lateral casing (44). Two metallic collector plates (48) form contacts at each end to the fiber anodes (22) and fiber cathodes (28), respectively.

18 Claims, 3 Drawing Sheets

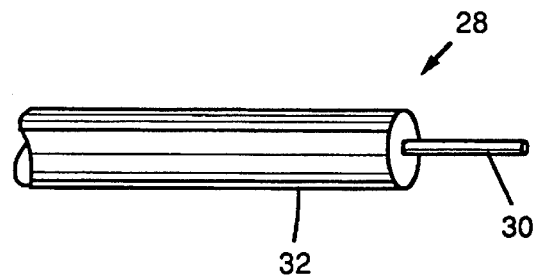
FIG. 4.
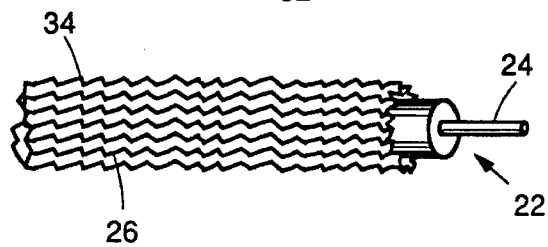
FIG. 3.
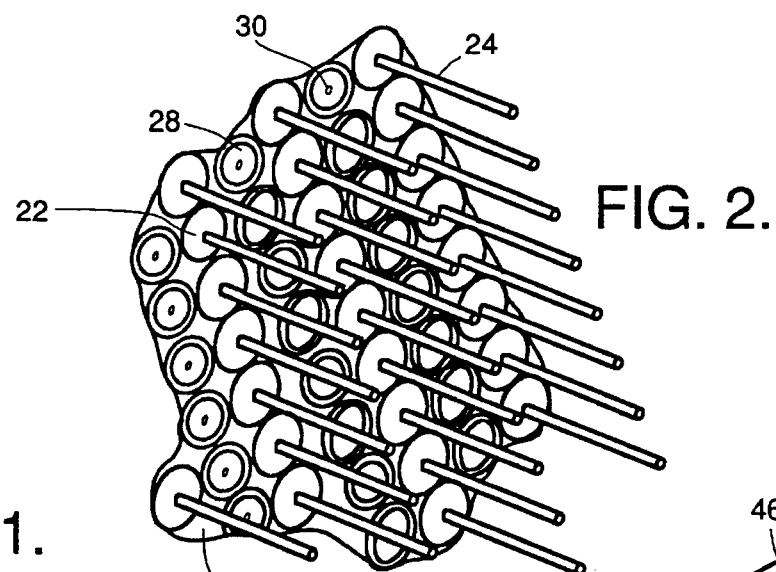
FIG. 2.
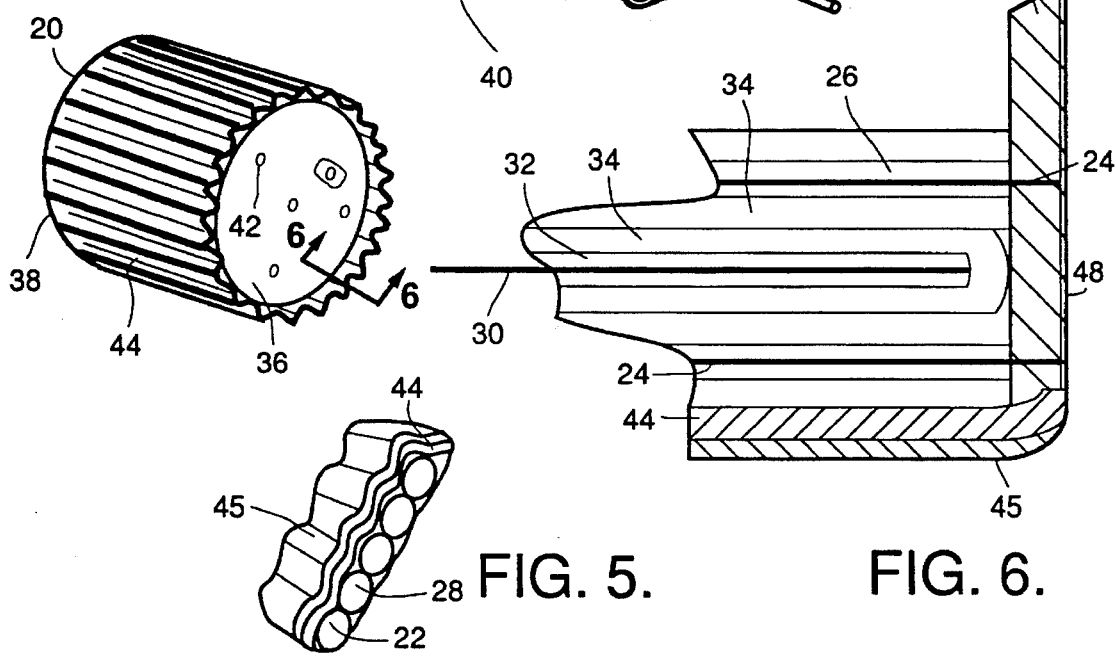
FIG. 1.
FIG. 5.
FIG. 6.

BATTERY HAVING FIBER ELECTRODES

BACKGROUND OF THE INVENTION

This invention relates to an electrical storage battery, and, more particularly, to such a battery having a high storage capacity.

Storage cells are electrochemical devices for storing and retaining an electrical charge and later delivering that charge at a useful voltage and as a useful current. A number of such storage cells are typically connected together electrically to form a battery having specific voltage or current delivery capability. The battery may be either of a non-rechargeable type or a rechargeable type. Familiar examples of the non-rechargeable battery are the dry cells used in many flashlights, toys, and the like. Familiar examples of the rechargeable battery are the lead-acid battery used in automobiles and the nickel-cadmium battery used in portable electronic devices such as cameras.

One of the ongoing challenges for the makers of some types of batteries is to increase their storage capacity per total battery weight and/or per total battery volume. For example, batteries used in spacecraft must be both light and compact, because they are launched from earth into space. Batteries used in electric automobiles must have as much capacity as possible for the available weight and volume, because the weight affects the vehicle mileage and the volume affects design considerations.

Many different approaches have been tried to increase the storage capacity of batteries. Various types of batteries, geometries, and construction techniques have been utilized. In one approach of interest, the cells of a ceramic honeycomb are filled with electrodes and electrolyte. A small honeycomb size can result in an improved storage capacity. However, such batteries typically experience internally produced damage relatively early in their operating lives, and cannot be used in long-life applications.

The is an ongoing need for an improved battery construction approach to improve the storage capacity per total weight or volume of the battery. The present invention fulfills this need, and further provides related advantages.

SUMMARY OF THE INVENTION

The present invention provides a battery construction and a method for its fabrication. The battery has a high weight and volume energy storage density, and can deliver a high current. The battery is readily formed in a plate configuration that is useful in a number of design situations. That is, the battery may be constructed to be relatively thin but large in lateral extent. There is a great deal of flexibility in design, while retaining a basic low cost.

In accordance with the invention, a battery comprises a plurality of fiber anodes, a plurality of fiber cathodes bundled with the fiber anodes, and an electrolyte between the fiber anodes and the fiber cathodes. A tubular compliant lateral casing laterally surrounds the fiber anodes, the fiber cathodes, and the electrolyte. A compliant end plate is sealed to the lateral casing at each end thereof. An end of each fiber anode extends out of a first end plate at a first end of the battery, and an end of each fiber cathode extends out of a second end plate at a second end of the battery.

Each pair of fiber cathode and fiber anode electrodes constitutes a cell. Since the electrodes are typically on the order of about 0.008 inches to about 0.050 inches in diameter in the preferred version, each cell is quite small in size. Only a relatively small amount of active material is required in each fiber component. With careful matching of the positive and negative fiber counts, there is little wasted space or weight in each cell, and there is a high level of active material utilization. The electrodes and electrolyte can be any of a wide range of operable materials, and therefore the battery structure of the invention can be made of many different anode/cathode/electrolyte types. The individual cells are assembled together with other cells to tailor the capacity and material balance of the battery to specific applications needs, so that the battery has the same optimized construction, high level of active material, and high weight and volumetric efficiency as the individual cells.

A key feature of the invention is the use of the compliant lateral casing and the compliant end plates. In some prior designs, such as a honeycomb design, the battery had little compliancy internally, at the walls, and at the ends. When the battery electrodes changed dimensions slightly during the usual charge/discharge cycle, the resulting stresses tended to cause fractures internally and in the housing. The compliant casing and end plates, preferably made of an elastomer, avoid such stresses and result in an extended battery life.

In accordance with a manufacturing aspect of the invention, a method for preparing a battery comprises the steps of providing a plurality of fiber anodes and a plurality of fiber cathodes, arranging the plurality of fiber anodes and fiber cathodes parallel to each other and in an alternating fashion within a flowable electrolyte, and placing a compliant lateral casing laterally surrounding the fiber anodes, the fiber cathodes, and the electrolyte. A compliant end plate is sealed to each end of the lateral casing such that an end of each fiber anode extends out of a first end plate at a first end of the battery, and an end of each fiber cathode extends out of a second end plate at a second end of the battery. The fiber anode is preferably prepared by drawing a fiber through a mass of negative battery paste so that battery paste adheres to the fiber, and curing the battery paste. The fiber cathode is similarly prepared by drawing a fiber through a mass of positive battery paste so that battery paste adheres to the fiber, and curing the battery paste.

The battery of the invention can be made relatively inexpensively in the preferred approach with mass production of the anodes and cathodes. Fibers of a nonmetallic electrical conductor such as carbon or a metallic electrical conductor such as aluminum, copper, or lead-coated titanium are drawn through an electrode paste, and the paste is cured. The fiber electrodes are then cut to the required lengths and laid up in an interspersed fashion. The casing and the end plates are applied by casting a hardenable elastomer or other compliant material over the resulting array, and curing the elastomer. The fibers are arranged so that the fiber anodes extend out of one cast end plate and the fiber cathodes extend out of the other cast end plate. The exposed ends are cut off, either flush or with a small exposed length, and a metallic electrode applied, as by wave soldering. With this approach, a generally planar battery with a large electrode surface area and an arbitrarily large lateral extent is readily fabricated.

The present invention provides an important advance in the art of battery structure and fabrication. The battery of the invention has a high energy storage density and can deliver a high discharge current due to the relatively low internal resistance resulting from the thin planar design. There is little wasted volume or weight. Other features and advantages of the present invention will be apparent from the following more detailed description of the preferred embodiment, taken in conjunction with the accompanying drawings, which illustrate, by way of example, the principles of the invention.

BRIEF DESCRIPTION OF THE DRAWINGS

FIG. 1 is a perspective view of a portion of a battery in accordance with the invention, with a part of one end removed to illustrate interior features;

FIG. 2 is an enlargement of an interior portion of FIG. 1;

FIG. 3 is an enlarged elevational view of a portion of a single anode;

FIG. 4 is an enlarged elevational view of a portion of a single cathode;

FIG. 5 is an enlargement of a casing portion of FIG. 1;

FIG. 6 is a side sectional view of a portion of the battery of FIG. 1, taken along lines 6—6;

DETAILED DESCRIPTION OF THE INVENTION

Figure 7:
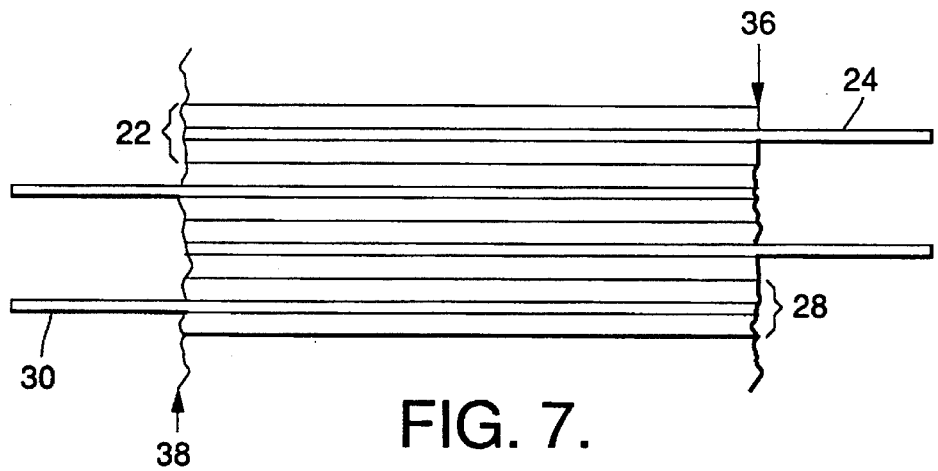
FIG. 7 is a side elevational view of a portion of the battery of FIG. 1, with the external casing removed.

FIG. 1 depicts a battery 20 according to the present invention. The battery 20 is preferably a platelike battery, wherein the battery is relatively thin compared to its lateral dimension. (This relative dimensional relation cannot be discerned in the view of FIG. 1, which depicts only a portion of the lateral extent of the battery 20.)

The battery 20 is formed with a plurality of interspersed fiber electrodes, as shown in FIG. 2. In the preferred structure shown in FIG. 3, each fiber anode 22 includes a central electrically conductive anode fiber 24 that acts as a current collector and an anode active material layer 26 surrounding the anode fiber 24. The fiber anode 22 is generally cylindrical in external shape. The composition of the anode fiber 24 and the anode active material 26 will depend upon the exact type of battery. In a typical case, the anode fiber 24 is a metal such as lead and the active material 26 is conventional cured negative battery paste. The anode fiber 24 may be coated to improve its electrical performance in its collector role.

A fiber cathode 28, shown in more detail in FIG. 4, includes a central electrically conductive cathode fiber 30 that acts as a current collector and a cathode active material layer 32 surrounding the cathode fiber 30. The fiber cathode 28 is generally cylindrical in external shape. The composition of the cathode fiber 30 and the cathode active material 32 will depend upon the exact type of battery. In a typical case, the cathode fiber 30 is graphite or metal and the active material 32 is conventional cured positive battery paste. The cathode fiber 30 may also be coated as desired to improve its performance.

At least one of each fiber anode 22 or each fiber cathode 28 is covered by a separator layer 34, to prevent shorting contact between the anode 22 and the cathode 28. In the preferred case, each of the fiber anodes 22 is covered with a woven glass fiber sheath whose ends are sealed with epoxy, as the separator layer 34.

The fiber anodes 22 and fiber cathodes 28 are arranged in an alternating, interspersed fashion as shown in FIG. 2. In this preferred form, the electrodes 22 and 28 are arranged in alternating layers. The electrodes are also arranged so that all of the anode fibers 24 extend out of a first end 36 of the battery 20 and all of the cathode fibers 30 extend out of a second end 38 of the battery 20. The view of FIG. 2 is from the first end, so only the elongated anode fibers 24 are seen. The cathode fibers 30 are apparent only from their ends, but extend in an elongated fashion out of the second end 38 of the battery 20. This arrangement is further depicted in FIG. 7, an enlarged elevational view of a region of the battery 20, but without showing the end connections.

The interstices 40 between the fiber anodes 22 and the fiber cathodes 28 are filled with an electrolyte such as sulfuric acid in the case of a lead/acid battery. Sealable combination vent and fill holes 42 are provided in the ends of the battery 20 for the purpose of venting internal pressure and adding electrolyte when the battery 20 is to be used.

The battery 20 is bounded on its lateral sides by a compliant casing 44 that is also an electrical insulator. As used herein, a compliant casing is a casing formed of a material that has elastic compliance or "give" when the interior of the battery 20 expands or shrinks. When a battery charges and discharges, its volume changes slightly. If the casing 44 were rigid, as for example a rigid ceramic or a rigid metal, the internal volumetric changes would create stresses that could cause internal or surface fractures within the battery. Internal fractures would reduce the storage capacity of the battery, while surface fractures would cause leakage of electrolyte.

The preferred material of the compliant casing 44 is an elastomer or a compliant plastic. In one approach, the preferred elastomer is castable. That is, it is provided in a liquid form that can be poured into a mold surrounding the array of electrodes 22 and 28, and then cured into a hardened, but compliant, solid form. A preferred elastomer is an elastomeric epoxy such as Epmar flexible epoxy. Other casing materials can include extruded polyvinyl chloride, polyolefin, polypropylene, or Noraprene$^R$ plastic, for example. The casing 44 is preferably about 0.050 inches thick in the hardened form. Optionally, a thin metallic housing 45 may be provided over the casing 44 to prevent punctures and to improve the handling and mounting characteristics of the battery, as shown in FIG. 6. The housing, if present, is not fitted tightly over the casing 44, so that the casing 44 may compliantly expand and contract during charge/discharge cycles in service. One desired approach is to corrugate the housing 45 to permit it to expand and contract during service, as shown in FIG. 5.

FIG. 6 illustrates the terminal connections, in this case at the first end 36 to the anode fibers 24. (The terminal connections to the cathode fibers are at the other end, and are similar in structure.) A compliant end plate 46 is applied at the first end 36 over the anode fibers 24 that extend from the first end 36. The compliant end plate 46 is preferably made of a castable compliant material such as that discussed above in relation to the compliant casing 44, and is sealed thereto. The compliant end plate 46 is preferably cast in place and cured, either at the same time the compliant casing 44 is cast and cured, or at a later time if that is more convenient in the manufacturing operation. The end plate 46 is made compliant for the same reason as the casing 44, to provide relief for internal stresses that would otherwise build up within the battery during repeated charge/discharge cycles. The end plate 46 is also electrically insulating, to provide general insulation and also to permit electrical connection to only one set of the electrodes at each end.

A metallic collector plate 48 is applied over the compliant end plate 46. Before the collector plate 48 is applied, the ends of the electrode fibers, here the anode fibers 24, are cut off to a uniform length. The anode fibers 24 may be flush with the surface of the end plate 46, or, preferably, extend out of the end plate 46 by some small amount. The collector plate 48 is a metal such as lead with a low melting point, and is applied by a technique such as wave soldering so that the entire battery 20 need not be heated to an elevated temperature.

Figure 8:
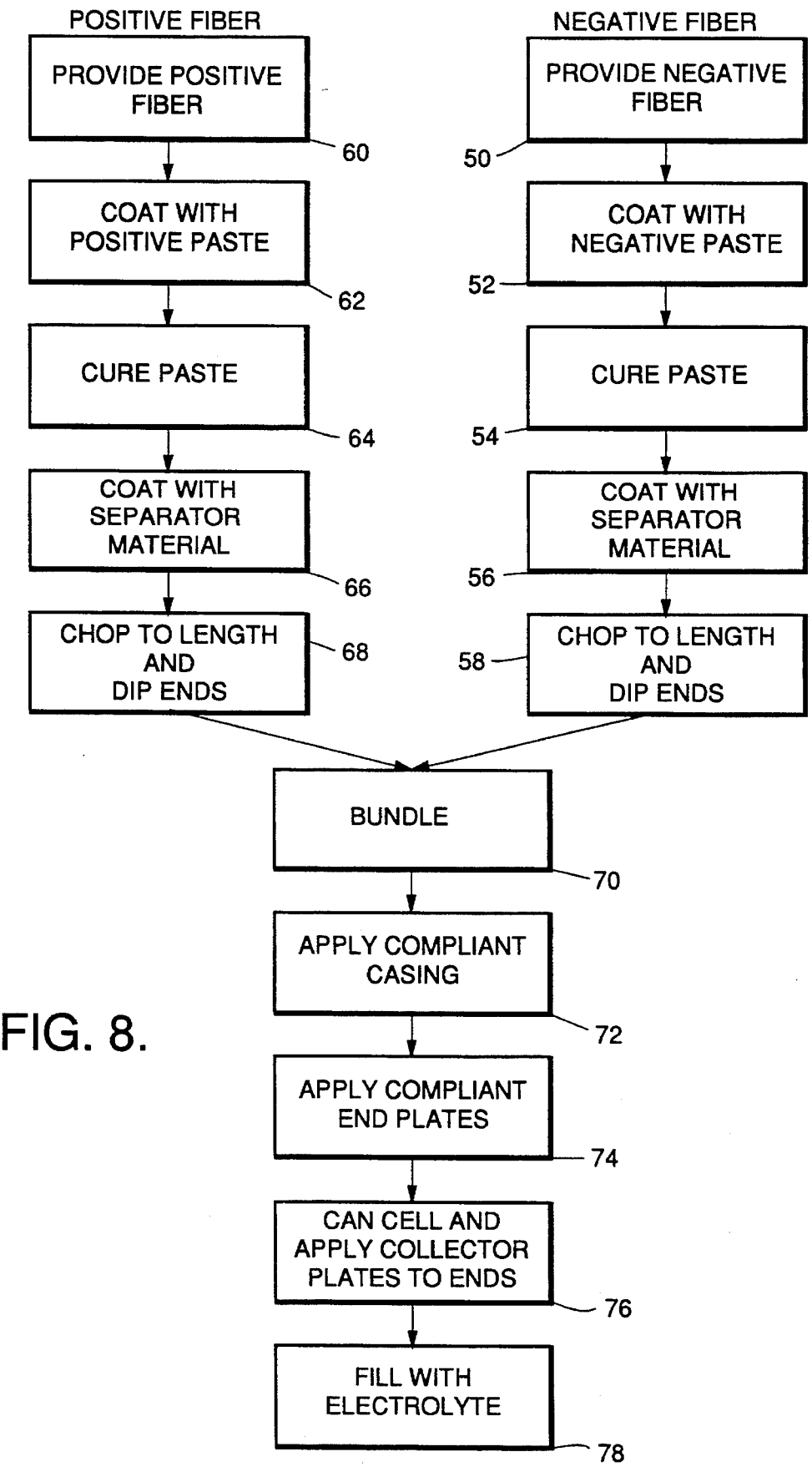
FIG. 8 is a process flow chart for the preparation of the battery of the invention.

FIG. 8 is a flow chart summarizing the fabrication procedure that has been used to prepare an operable battery 20. The process is generally applicable, but in the following discussion the specific procedure for preparing a working embodiment of the invention will be described. This battery was a lead/acid battery.

The negative fiber anodes 22 were prepared, numeral 50. The anode fiber 24 was made of a material such as lead, lead-coated S-glass, or copper, which optionally may be wrapped with carbon fiber. When the carbon wrapping is used, the anode fiber 24 may be precoated with a thin layer of another material, such as tin oxide ($SnO_2$) or barium antimonide (BaSb), in the case of the metal fiber. The anode fiber 24 is preferably from about 0.008 to about 0.012 inches in diameter, but may be larger. Preferably, the diameter is not larger than about 0.080 inches.

Figure 9:
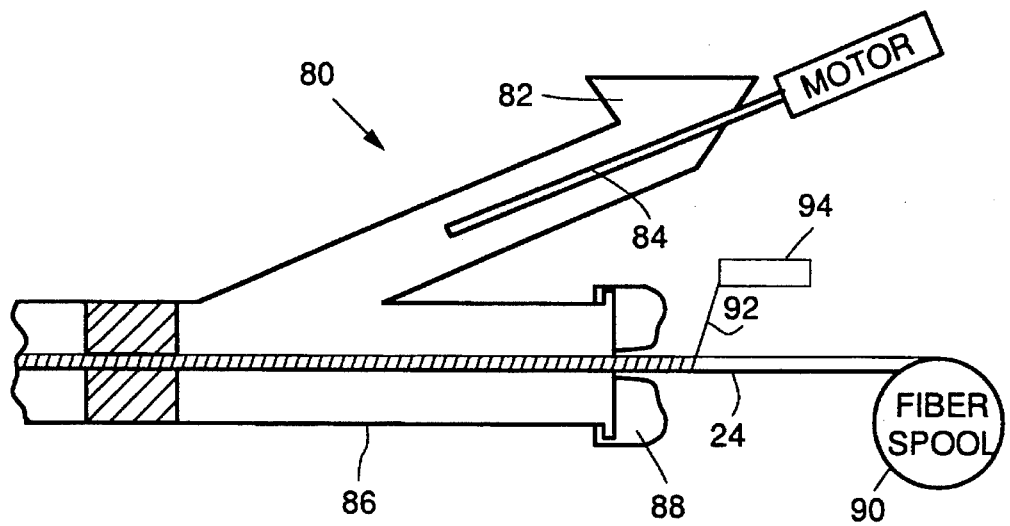
FIG. 9 is a perspective view of an apparatus for preparing coated electrode fibers.

To apply the active material 26 as a paste, numeral 52, an apparatus such as that of FIG. 9 was used. A flowable paste of standard negative active material paste mix was prepared according to well known procedures, using carbon particles mixed with oxides, barium sulfate, sulfuric acid, and water. This flowable paste mix was loaded into an applicator 80 having a reservoir 82 with a plunger or pump augur 84 by which pressure can be applied to the paste mix. The applicator 80 further had an applicator tube 86 through which the anode fiber 24 was threaded. The inside diameter of the applicator tube 86 was preferably slightly larger than the desired diameter of the fiber anode 22 when complete. A rubber septum 88 at one end permitted the anode fiber 24 to be passed into the applicator tube 86.

In the illustrated embodiment, the anode fiber 24 was delivered from a spool 90. Before it was wound onto the spool, the anode fiber 24 was first coated with an adhesive such as a graphite cement and cured under tension and twist in air overnight, then heated to 150° C. for two hours and 500° C. for ½ hour in a reducing gas to complete curing of the graphite cement. The anode fiber was wrapped with carbon fiber 92 by a spiral 24 wrapping head 94 as it moved from the spool 90 to the applicator tube 86. The fiber anode 22 and wrapped carbon fiber 92 passed through the septum 88 into the interior of the applicator tube 86.

The negative paste was applied continuously, numeral 52, by turning the augur 84 as the anode fiber 24 was drawn through the applicator tube 86. Paste mixture was extruded out of the open end of the applicator tube 86 adhering to the surface of the anode fiber 24. The fibers were washed in deionized water until the acid level was 0.05 percent. The anodes were dried in vacuum at 40° C. The paste was hardened and cured, numeral 54, by heating the paste-coated fiber to 60°–90° C. for 12 hours in air of 98 percent relative humidity. The anodes were covered with the separators 94 made of a woven sheath of glass fibers and sealed at the ends with epoxy, numeral 56. The anode fiber 24 was chopped to the required length, numeral 58, and one end of each fiber was dip coated with a metallic contact material such as lead. The final diameter of each fiber anode 22 was about 1 millimeter.

Positive fiber cathodes 28 were prepared in a similar manner, except that the cathode fibers 30 were preferably an aluminum core coated with molten lead by drawing the core through a lead bath, numeral 60. The cathode fibers 30 were coated with standard positive battery paste of oxides, chopped carbon fibers, red lead, sulfuric acid, and water, using the applicator 80 except with another diameter of applicator tube 86 as desired. The battery paste was cured as necessary, numeral 64, in this case at 60°–90° C. for 42–72 hours in air of 98 percent relative humidity. The separator material was coated onto the fibers 30, numeral 66. (Step 66 may be omitted, if a separator material has been placed onto the fibers 24 in step 56.) The fibers 30 were chopped to length and one end dip coated with a metallic conductor, preferably lead, numeral 68.

The electrodes were dry charged by winding them onto a conducting mandrel and applying a constant potential until less than 5 percent sulfite remained in the active material.

The prepared fiber anodes 22 and fiber cathodes 28 were bundled together into alternating layers, as shown in FIG. 2, numeral 70. The ends were alternated as previously described, with anode fibers 24 extending from the first end 36 and the cathode fibers 30 extending from the second end 38 of the battery 20, as shown in FIGS. 6 and 7.

The compliant casing 44 was applied, numeral 72. Two different approaches to applying the casing 44 were tried and found operable. In one, a polyolefin tube was heat shrunk onto the fiber bundle. In the other, the fiber bundle was inserted into an extruded tube of elastomer.

The compliant end plates 46 were applied, numeral 74. Epmar flexible epoxy was sprayed onto the ends of the bundle and flash dried. The precoated end of the bundle was flooded with more of the flexible epoxy and cured at a temperature of about 25° C. to about 55° C. for 3 hours. Openings for the fill holes 42 were provided through the end plates 46.

The bundle coated on the sides and ends with compliant material was placed into the aluminum corrugated housing 45, numeral 76. The ends of the anode fibers 24 (extending from the first end 36) and the ends of the cathode fibers 30 (extending from the second end 38) were cut off using a microtome so that about 0.001 inch protruded from the elastomer end plates. A lead collector plate 48 was applied to each end by wave soldering, numeral 78.

The completed battery may then be activated by forming fill holes 42 through the ends of the collector plate 48 and the end plate 46, and adding an electrolyte, in this case sulfuric acid. After charging the electrolyte, the fill holes are closed.

The first demonstration lead-acid battery prepared according to this approach had a total of 15 of the fiber anodes and 10 of the fiber cathodes. The battery was AA size, with a diameter of 1.3 centimeters and a length of 4.9 centimeters. The battery, having a volume of 6.5 cubic centimeters and a weight of 9.36 grams, was able to store a total charge of 0.468 WHr (watt-hour), which could be delivered at 10 amperes current. The storage density was therefore about 50 WHr per kilogram. By comparison, a small lead-acid dry cell has a storage capacity of about 17–20 WHr per kilogram, and a large lead-acid cell has a storage capacity of about 30–35 WHr per kilogram.

A second demonstration lead-acid battery had 440 fiber cathodes and 385 fiber anodes, in a cylindrical cell having a radius of 1.47 inches and a length of 2.39 inches. The fiber anodes and cathodes each had a fiber diameter of 0.008 inches, a thickness of active material with outside diameter of 0.026 inches, and a separator coating with an outside diameter of 0.093 inches. The mass balance of the cell was as follows: 81.94 grams negative active material, 81.51 grams positive active material, 111.0 grams of sulfuric acid of 1.310 specific gravity, 16.9 grams of separator, 15.49 grams of end plates, 11.56 grams of current collectors, 5.0 grams of vent structure, and 12.0 grams in the outside case. The storage capacity of this battery was 59 WHr per kilogram, as compared with 41.5 WHr per kilogram for the best commercially available battery of comparable size.

The battery of the invention has a large amount of electrode surface area due to the small diameters of the fiber anodes and fiber cathodes. The fiber-based fabrication technology permits the selection of a range of fibers, fiber coatings, and active material, as well as a choice of electrolyte. The battery does not develop stress-induced cracking after cycling, due to the compliant casing and end plates.

A third demonstration involved the construction and testing of a pseudo capacitor sometimes termed a "Batcapion". Such a pseudo capacitor is within the scope of the term "battery" as used herein, inasmuch as it incorporates characteristics of both a battery and a capacitor. The fibers were prepared from P100 carbon fiber tows, each having about 500 carbon fibers of 10 micrometer diameter. A 0.008 inch diameter silver wire was incorporated into the bundle of carbon fibers. The bundle of carbon fibers and silver wire was draw coated with Dylan 100 graphite cement with 3–5 percent extra furfuval alcohol. The coated bundles were fired in an oxidizing then a reducing atmosphere at 480° C. for 40 minutes. The resulting fibers were cut to lengths of 2 centimeters, and the silver core wire was exposed by striping the cured cement from the ends of the wire. Half of the fibers (the positive electrodes) were platinized with about 4–10 milligrams per square centimeter of platinum by electroplating in chloroplatinic acid, and thereafter washed and dried. The other half of the fibers (the negative electrodes) were multi-dip coated to a thickness of 0.006 inches in an ink made from $RuO_2$-$IrO_2$ powder of less than 600 mesh and 60–80 volume percent of Nafion 100 solution, and dried at 110° C. in an oven. The fibers were all individually tested using a 2 centimeter length wetted with 20 percent sulfuric acid and matted dry, and then assembled into bundles with a dip coating on the electrode of the Nafion 100 solution and dried. The bundles were tested with an inter-fiber distance of 0.005 inches. The resulting batcapion structure, with 400 electrode pairs, exhibited a 24 Farad capacitance in the volume of a "D" size cell, when tested at 1.5 volts, 60 Hertz.

Another batcapion was prepared using the same approach, but with a fiber length of 0.5 centimeters. The resulting structure had a capacitance of 120 Farads in a ten-tier cell stack. These results were obtained without attention to optimization of the structure. Further optimization of the structure offers the potential for additional improvements.

Figure 10:
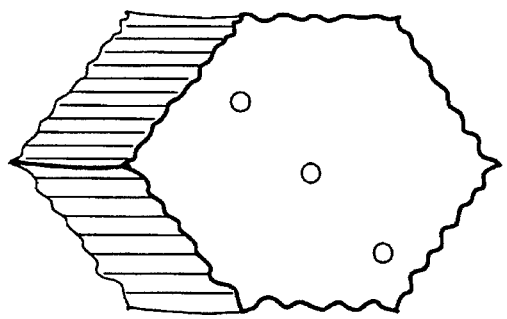
FIG. 10 is a perspective view of a hexagonally shaped battery.

Other variations are possible, as well. For example, the battery may be of any desired external shape to conform to available space. For example, FIG. 10 shows a hexagonal battery.

Although particular embodiments of the invention have been described in detail for purposes of illustration, various modifications may be made without departing from the spirit and scope of the invention. Accordingly, the invention is not to be limited except as by the appended claims.

What is claimed is:

1. A battery, comprising:

a plurality of fiber anodes;

a plurality of fiber cathodes bundled with the fiber anodes;

an electrolyte between the fiber anodes and the fiber cathodes;

a tubular compliant lateral casing laterally surrounding the fiber anodes, the fiber cathodes, and the electrolyte; and a compliant end plate sealed to the lateral casing at each end thereof, an end of each fiber anode extending out of a first end plate at a first end of the battery, and an end of each fiber cathode extending out of a second end plate at a second end of the battery.

2. The battery of claim 1, wherein the fiber anodes each comprise an anode fiber, and a layer of an anode active material overlying the anode fiber.

3. The battery of claim 2, further including a layer of a separator material overlying the layer of anode active material.

4. The battery of claim 2, wherein the anode fibers each have a diameter of from about 0.008 to about 0.050 inches.

5. The battery of claim 1, wherein the fiber cathodes each comprise a cathode fiber, and a layer of a cathode active material overlying the cathode fiber.

6. The battery of claim 5, further including a layer of a separator material overlying the layer of cathode active material.

7. The battery of claim 5, wherein the cathode fibers each have a diameter of from about 0.008 to about 0.050 inches.

8. The battery of claim 1, wherein at least some of the fiber anodes and the fiber cathodes are made at least in part of graphite.

9. The battery of claim 1, wherein at least some of the fiber anodes and the fiber cathodes are made at least in part of metal fiber.

10. The battery of claim 1, further including a metallic collector plate overlying the compliant end plate at each end of the battery.

11. The battery of claim 1, further including a protective housing overlying the lateral casing.

12. The battery of claim 11, wherein the protective housing is made of metal, and the metal is corrugated.

13. A battery, comprising:

a plurality of fiber anodes, each of the fiber anodes comprising an anode fiber, and a layer of an anode active material overlying the anode fiber;

a plurality of fiber cathodes bundled with the fiber anodes, each of the fiber cathodes comprising a cathode fiber, and a layer of a cathode active material overlying the cathode fiber;

an electrically nonconducting separator layer between the fiber anodes and the fiber cathodes;

an electrolyte between the fiber anodes and the fiber cathodes;

a tubular compliant lateral casing laterally surrounding the fiber anodes, the fiber cathodes, the separator, and the electrolyte;

a protective housing overlying the lateral casing;

a compliant end plate sealed to the lateral casing at each end thereof, an end of each anode fiber extending out of a first end plate at a first end of the battery, and an end of each cathode fiber extending out of a second end plate at a second end of the battery; and a metallic collector plate overlying the compliant end plate at each end of the battery.

14. A method for preparing a battery, comprising the steps of: providing a plurality of fiber anodes and a plurality of fiber cathodes;

arranging the plurality of fiber anodes and fiber cathodes parallel to each other and in an bundled fashion within a flowable electrolyte;

placing a compliant lateral casing laterally surrounding the fiber anodes, the fiber cathodes, and the electrolyte; and sealing a compliant end plate to each end of the lateral casing such that an end of each fiber anode extends out of a first end plate at a first end of the battery, and an end of each fiber cathode extends out of a second end plate at a second end of the battery.

15. The method of claim 14, wherein the step of providing includes the steps of applying a coating of a positive battery paste to a cathode fiber and curing the coated cathode fibers, and applying a coating of a negative battery paste to an anode fiber, and curing the coated anode fibers.

16. The method of claim 15, wherein the steps of applying each includes the step of drawing a fiber through a mass of the respective battery paste so that battery paste adheres to the fiber.

17. The method of claim 14, wherein the step of providing includes the additional step of placing a separator layer over at least one of each of the coated plurality of fiber anodes and each of the coated plurality of fiber cathodes.

18. A method for preparing a battery, comprising the steps of:

drawing an anode fiber through a mass of negative battery paste so that battery paste adheres to the anode fiber, and curing the battery paste to form a fiber anode;

drawing a cathode fiber through a mass of positive battery paste so that battery paste adheres to the cathode fiber, and curing the battery paste to form a fiber cathode;

arranging the plurality of fiber anodes and fiber cathodes parallel to each other and in an alternating fashion;

placing a compliant lateral casing around the sides of the fiber anodes, the fiber cathodes, and the electrolyte;

placing a compliant end plate at each end of the lateral casing such that an end of each fiber anode extends out of a first end plate at a first end of the battery, and an end of each fiber cathode extends out of a second end plate at a second end of the battery;

slicing off the fiber anode and cathode ends; and placing an electrically conductive material overlying the surfaces of the respective end plates.

* * * * *